United States Patent
Enders-Douglas

(10) Patent No.: US 9,005,919 B2
(45) Date of Patent: Apr. 14, 2015

(54) METHOD AND DEVICE FOR THE PRODUCTION OF A FERTILIZER PRECURSOR AND OF A FERTILIZER

(75) Inventor: Anja Enders-Douglas, Oberleichtersbach (DE)

(73) Assignee: Rhönschotter GmbH, Oberleichtersbach (DE)

( * ) Notice: Subject to any disclaimer, the term of this patent is extended or adjusted under 35 U.S.C. 154(b) by 0 days.

(21) Appl. No.: 13/822,193

(22) PCT Filed: Oct. 29, 2010

(86) PCT No.: PCT/DE2010/001251
§ 371 (c)(1),
(2), (4) Date: Mar. 11, 2013

(87) PCT Pub. No.: WO2012/037908
PCT Pub. Date: Mar. 29, 2012

(65) Prior Publication Data
US 2013/0171690 A1    Jul. 4, 2013

(30) Foreign Application Priority Data

Sep. 20, 2010    (DE) .......................... 10 2010 045 831

(51) Int. Cl.
*C12P 39/00* (2006.01)
*C12P 1/00* (2006.01)
*C05F 17/00* (2006.01)
*C05D 9/00* (2006.01)
*C05F 17/02* (2006.01)

(52) U.S. Cl.
CPC ............. *C05F 17/0045* (2013.01); *C05D 9/00* (2013.01); *C05F 17/0264* (2013.01)

(58) Field of Classification Search
USPC .................................................... 435/42, 41
See application file for complete search history.

(56) References Cited

FOREIGN PATENT DOCUMENTS

| CN | 101215200 A | 7/2008 |
| CN | 101384522 A | 3/2009 |
| FR | 518 184 A | 5/1921 |
| FR | 623 247 A | 6/1927 |
| GB | 146 351 A | 1/1922 |
| GB | 270 957 A | 5/1927 |

OTHER PUBLICATIONS

READE Advanced Materials. Bentonite/Montmorillonite Clay powder from READE.*
Harvey et al. Overview of Mineral Matter in US Coals. (2006) Illinois State Geological Survey).*
Diver et al. (Rock Dusts in Agriculture: Insights on Remineraliation and Paramagnetism. (2007) pp. 1-13).*
The State Intellectual Property Office of the People's Republic of China, First Office Action, Application No. 201080069102, Nov. 19, 2013, 23 pages.
International Search Report and Written Opinion as mailed on Jul. 11, 2011 for International Application No. PCT/DE2010/001251.
Database WPI, Week 200877, Thomson Scientific, London, United Kingdom, AN 2008-N03347, XP002645449, Jul. 4, 2011.
PCT Translation of the International Preliminary Report on Patentability, PCT/DE2010/001251, Apr. 4, 2013.

* cited by examiner

*Primary Examiner* — Sharmila G. Landau
*Assistant Examiner* — Natalie Moss
(74) *Attorney, Agent, or Firm* — Quarles & Brady LLP

(57) ABSTRACT

The invention relates to a method and a device for the production of a fertilizer precursor or of a fertilizer. The method comprises the following method steps: a) production of an acidic source solution (05) in which at least one organic acid is present in dissolved form; b) addition of the acidic source solution (05) to at least one substance containing minerals; c) artificial weathering of the minerals present in the substance containing minerals by means of the source solution. The device for producing organomineral fertilizer comprises at least one device for providing an organomineral compound or a substance containing minerals, at least one device for at least one mechanical preprocessing of the organo-mineral compound and at least one solution storage device (50) which comprises an outlet device (51) which makes possible a release of an acidic source solution (05) onto the provided mechanically pretreated compound, wherein an addition of the acidic source solution (05) to the compound triggers at least the technical weathering of the minerals comprised in the substrate.

11 Claims, 3 Drawing Sheets

METHOD AND DEVICE FOR THE PRODUCTION OF A FERTILIZER PRECURSOR AND OF A FERTILIZER

CROSS-REFERENCE TO RELATED APPLICATIONS

This application represents the national stage entry of PCT International Application No. PCT/DE2010/001251 on Oct. 29, 2010 and claims the benefit of German Patent Application No. 10 2010 045 831.7 filed Sep. 20, 2010. The contents of both of these applications are hereby incorporated by reference as if set forth in their entirety herein.

The invention relates to a method and a device for producing a fertilizer precursor and a fertilizer.

From the state of the art, fertilizers as well as methods and devices for their production are known, which are provided for replenishing plant nutrients in the soil. These nutrients are, first and foremost, phosphor, nitrogen and potassium. However, the so-called compound fertilizers or NPP fertilizers, which can also be enriched with individual other minerals, lead to a plurality of disadvantages when acreage or soil is intensively cultivated agriculturally and, thus, intensively fertilized.

First, intensive fertilization of an agriculturally used area leads to a salinization and karstification of the soil area. This is accompanied by a deterioration of the mechanical soil structure which is also of special importance to plant growth. At the same time, the deterioration of the capacity for storing nutrients and water in such an over-fertilized soil is the result. The salinization of the soil further leads to a decline in the plants' capacity to take up nutrients due to the osmotic pressure gradient. Additionally, the known fertilizers always lead to an unbalanced nutrient supply of the soil, which is reflected in the low content of important nutrients for humans and animals in the crops and produce of such intensively cultivated and fertilized soils. After all, negative effects are also known for the water cycle, such as algal bloom or water salinization.

According to these facts, the use of known fertilizers leads to a downward spiral which continuously worsens the quality of the soil and its produce. Another disadvantage of known fertilizers is to be found in to the fact that their production costs are so high that they are simply too expensive for the use in developing and/or emerging countries.

Starting from this state of the art, it is therefore the object of the present invention to provide a novel fertilizer precursor as well as a novel fertilizer and a method for their production, which maintains or restores the biochemical balance of the soil and, at the same time, ensures a balanced nutrient supply for the plants with extremely low doses of fertilizer. Under the collective term of maintenance or restoration of the soil balance, several objects of the present invention are combined. They are, for example: the improvement of the soil structure on a biochemical, microbiological, bacterial and mechanical level, the improvement of the water and/or nutrient storing capacity, in particular micronutrient capacity and/or ion exchange capacity, and the stimulation of the self-regeneration of the soil. Further, it is the object of the invention to create higher, less perishable, nutrient-richer and Fusarium-free crop yields on the soils fertilized with the invention.

This object is attained by a method and device described herein.

Advantageous embodiments of the invention are the subject matter of the dependent claims.

The invention is based on the fundamental idea that the weathering of at least one substance containing minerals is performed technically in analogy to the processes taking place in an intact, healthy soil. Therein, the similarity to the weathering processes taking place in nature leads to all components of the fertilizer or the fertilizer precursor promoting and/or restoring the soil balance. Therein, the special inventive step of the proposed method lies in the fact that the technical weathering of at least one substance containing minerals takes place on a much larger scale than in nature and also an enormous increase in weathering speed is achieved. Regarding weathering speed it can be assumed that by means of the method according to the invention a nature-like technical mineral weathering with a speed a thousand times faster compared to the biochemical weathering taking place in healthy soil can be achieved.

For that purpose, the method according to the invention provides that in a first method step an acidic source solution is produced, which comprises at least one organic acid. In the subsequent second method step, the acidic source solution is added to at least one substance containing minerals. Then, in a further method step, the artificial weathering of the minerals comprised in the substance containing minerals by means of the source solution follows.

In order to raise the reactivity and/or the reaction speed of the acidic source solution, the method according to the invention provides that the pH value of the source solution is in a range between pH 0 and pH 3.

In order to achieve the highest possible similarity in the technical weathering to the weathering processes taking place naturally in healthy soil, it is particularly advantageous if the acidic source solution comprises further ingredients which are also present in terms of their type and/or function in the natural, biochemical weathering of minerals in the planting soil. Accordingly, the method according to the invention provides that at least one amino acid is dissolved in the source solution and/or at least one enzyme is dissolved in the source solution and/or at least one alcohol is dissolved in the source solution and/or the source solution comprises at least one species of bacteria and/or at least one yeast strain is dissolved in the source solution and/or caffeine is dissolved in the source solution and/or at least one antibiotic substance is dissolved in the source solution and/or at least one polyphenol is comprised in the source solution.

Such a complex source solution can be obtained especially effectively, i.e. simply and quickly in terms of quality and quantity of composition, in particular if for producing the acidic source solution a natural biochemical process is applied, too. Hence, an advantageous embodiment of the method according to the invention provides that the acidic source solution is created by converting of a nutrient solution with a symbiotic colony of bacteria and yeasts, in particular by converting a sugared tee solution with kombucha. As an acronym for a symbiotic colony of bacteria and yeast, SCOBY is often used as an abbreviation.

Since in nature rocks are the starting point for natural weathering and, thus, the starting point for the provision of nutrient minerals for plants, it is provided that in the method according to the invention rocks are used as a substance containing minerals for artificial weathering. In other words, this means that contrary to the known methods for producing fertilizers and/or fertilizer precursors, it is in fact not the object of the suggested method to obtain individual plant nutrients in the purest form possible and then produce a nutrient mix, but to artificially weather substances containing minerals, in particular rocks, whose mineral contents are particularly balanced and also lead to extraordinarily fertile soils in nature during natural weathering. Therefore, it is provided in the method according to the invention that the at least one substance containing minerals includes rock flour, in particular primary rock flour or geomineral flour. The use of rock flour is particularly advantageous for the method because due to an enlarged surface compared to unground rock it guarantees a more effective impact of the acidic source solution and, thus, an optimized process of the technical weathering.

According to another advantageous embodiment of the method according to the invention, it is provided that the at least one substance containing minerals comprises primary rock flour, in particular primary rock flour of magmatic origin, from diabase (US: greenstone) and/or diatoms and/or bentonite and/or lignite. For an optimal fertilizing effect it is further particularly advantageous if a rock flour containing $Fe^{2+}$ is present in the at least one substance containing minerals. The use of diabase (US: greenstone) is advantageous due to the specific mineral and trace element content. Bentonite is characterized by its high cation exchange capacity (CEC) for the method according to the invention. The use of lignite in the substance containing minerals of the method provides for a sufficient presence of humic substances. When using lignite it is particularly advantageous if the sulfur content lies between 3% and 9%, in particular between 5% and 7%.

An optimal technical weathering of the at least one substance containing minerals is given if rock flour with grain sizes of 10 to 40 μm, in particular 10 to 20 μm, is present in the at least one substance containing minerals.

A further acceleration of the technical weathering is achieved in the method according to the invention by the at least one substance containing minerals being enclosed in a container permeable to the acidic source solution, in particular in a textile tissue bag made of synthetic or natural fiber. It has proven particularly advantageous if the at least one substance containing minerals is enclosed in a tissue bag made of nylon or polyamide while it is in contact with the acidic source solution.

An almost complete conversion or artificial weathering of the at least one substance containing minerals is achieved if said substance is in contact with the acidic source solution over a period of 7 to 60 days, in particular between 30 and 60 days. Here, many different factors can influence the respective period of time of the artificial weathering. Apart from the temperature at which the technical weathering takes place, conditions, such as container size, container geometry and/or mechanical influences on the acidic source solution and the substance containing minerals present therein, can influence the necessary weathering time.

The solution arising from the technical weathering of the at least one substance containing minerals with the acidic source solution can already be called a fertilizer precursor. Even if it is not yet suitable for a direct application in the soil, it does offer the starting point for an effective fertilization without adversely affecting the mechanical and/or biochemical and/or bacterial and/or microbiological soil conditions and for an improvement of the water and nutrient storage and the ventilation or aeration. To make such fertilization possible, the method according to the invention provides that the solution arising from the technical weathering is added to a carrier solution. In doing so, the carrier solution can fulfill many different tasks regarding its function in the application of the fertilizer and the interaction with the fertilizer precursor. For example, it can be provided that the carrier solution itself is enriched with plant metabolite nutrients, in particular nitrogen compounds and/or flavonoids. Alternatively, it can also be provided that the carrier solution comprises substances which increase the activity of microorganisms and/or fungi already present in the soil. Thereby, the fertilizer produced with the method according to the invention, by adding the fertilizer precursor to the carrier solution, can not only provide nutrients, but can also positively influence the storage, processing, supply and transport of nutrients to the plant in the soil as well as the mechanical anchoring of the plant in the soil.

A particularly advantageous composition of nutrients of the fertilizer is achieved when fertilizer precursors from a separate technical weathering of diabase (US: greenstone) rock flour, diatoms rock flour, lignite rock flour and rock flour containing $Fe^{2+}$ are added to the carrier solution in equal volume fractions. For example, it can be provided that between 35 and 65 ml of the fertilizer precursor obtained by weathering one rock flour, respectively, is added to 1 liter of the carrier solution.

In order to preclude an adverse effect on the pH value of the soil for which the respective fertilizer is to be used, it is particularly advantageous if the method according to the invention comprises a method step in which, after adding the at least one solution or fertilizer precursor obtained by artificially weathering at least one substance containing minerals to the carrier solution, a dilution to a neutral pH value, in particular a pH value between 6.8 and 7.2, is performed. Alternatively, it can also be provided that the pH value of the soil is specifically influenced by adding the fertilizer produced with the method according to the invention. Thus, it can be advantageous if, after the addition of the at least one solution or fertilizer precursor obtained by artificially weathering at least one substance containing minerals to the carrier solution, a dilution to a pH value necessary according to the desired influence on the pH value of the soil takes place.

In order to increase the activity of microorganisms and the activity of other organisms present in the soil and to at the same time introduce additional plant nutrients into the soil, it is particularly advantageous if the carrier solution is produced from a biomass fermentation solution and a nutrient solution. Here, the method according to the invention provides that, apart from the enrichment with plant nutrients, the nutrient solution is provided in particular for the increase of organisms present in the soil area and the biomass fermentation solution is provided in particular for the further accumulation of plant nutrients in the fertilizer.

In the production of the biomass fermentation solution, too, it is sensible if for obtaining plant nutrients processes are implemented which resemble the natural processes for the extraction of plant nutrients from biomass. To this effect, an advantageous embodiment of the method according to the invention provides that the biomass fermentation solution is obtained by fermenting a liquid, sugared biomass extract with a SCOBY, in particular kombucha. Analogously to obtaining minerals from the at least one substance containing minerals, the use of a symbiotic culture of bacteria and yeasts is indicated in obtaining the biomass fermentation solution, too, by the fact that such a fermentation of biomass comes very close to the natural processes in an intact planting soil. Alternatively, it can also be provided that, from a sugared solution with the SCOBY an acidic source solution is again produced at first, which is then used for the fermentation of the liquid biomass extract. At this point it should be noted that the above-mentioned biomass conversion is not exclusively a fermentation in the sense of a conversion taking place under oxygen exclusion. Aerobic conversion, so-called respiration, takes place to some degree as well. For the purpose of terminological standardization and simplification, the term fermentation will be used here in the following.

In order not to have any adverse effects on the reactants and products of the fermentation and, at the same time, allow for a fastest possible fermentation process, one advantageous embodiment involves the fermentation taking place at temperatures of 20° C. to 30° C., in particular at 24° C. to 28° C.

The duration of the fermentation which is advantageous for the method according to the invention does not exclusively, but at least partially depend on the choice of the fermentation temperature. For the suggested method, it has been found that a fermentation over a period of 3 to 4 weeks results in a particularly high yield of nutrients obtained by the fermentation of biomass.

Furthermore, it is particularly advantageous for the extraction of nutrients from biomass by means of biomass fermentation if the liquid biomass extract is produced by means of a heat treatment of plants and/or by extracting the juice from plants, in particular nettles, placed in biologically stabilized water. The use of nettles for the production of the biomass extract is particularly advantageous since they are particularly undemanding plants which are available in large amounts without special breeding and also have a high nitrogen content. Said nitrogen can be effectively recovered by fermentation of the biomass extract and can be reintroduced into the soil via the fertilizer according to the invention.

A particularly effective provision of additional nutrients from the fermentation of the biomass extract can be achieved in that, for the production of the biomass extract, between 5 and 60 g of biomass, in particular plants, per liter of biologically stabilized water are used. The exact mass concentration which renders the best results here depends on the respectively used biomass or plant.

For producing a high grade biomass extract, the method according to the invention further provides that the biomass or plants placed in biologically stabilized water undergo a heat treatment at a temperature between 75 and 95° C., in particular between 80 and 90° C.

The best possible effect on a subsequent extraction of nutrients from the biomass extract is guaranteed if the heat treatment takes place over a period of 5 to 25 minutes, in particular over a period of 10 to 20 minutes.

Apart from the task of the carrier solution to take up the nutrients provided by artificial or abiotic weathering or the nutrients provided by biomass fermentation, it is further provided that the activity of the microorganisms present in the soil is stimulated by the nutrient solution content of the carrier solution. Since the metabolism of microorganisms present in the soil can be promoted, for example, by sugar, in particular by byproducts of the refining of sugar, such as molasses, the method according to the invention provides that the nutrient solution comprises at least sugar dissolved in biologically stabilized water, in particular molasses. The use of biologically stabilized water makes it possible that no plant pests and/or germs spoil the fertilizer according to the invention.

For the production of the nutrient solution it is further provided that 20 to 50 ml or 40 to 60 g sugar, in particular molasses, are used per liter of biologically stabilized water.

In order to facilitate the application of the fertilizer according to the invention and/or to create an additional positive effect on the mechanical structure of the soil to be fertilized, in an advantageous embodiment of the method, the fertilizer is added to a carrier material, in particular an organic carrier material. Here, the previous adaption of the pH value of the fertilizer to a neutral pH value is particularly advantageous. Therein, it can be provided that a carrier material is used which is rich in nitrogen compounds and/or humic substances, in particular from the groups comprising lignin, cellulose, plant resins and plant waxes and/or carbohydrates. By using a carrier material, the functionality of a soil improvement agent is additionally given to the fertilizer.

A particularly far-reaching positive interaction between the fertilizer according to the invention and an organic carrier material can be achieved if the organic carrier material to which the fertilizer is added according to an advantageous embodiment is an organic fertilizer, in particular compost and/or peat and/or hydrothermally cell digested and/or sanitized and/or defibrated wood fiber substrates. These organic fertilizers can improve in particular the mechanical structure of a soil and thus can increase the water and nutrient storage capacity and can support the self-regeneration of the soil. Since these organic fertilizers per se can provide only a very low nutrient supply, in particular from a narrow spectral range of the required nutrients, the combination of an organic fertilizer with a fertilizer according to the invention or with a combination of a carrier solution according to the invention, which comprises at least one solution obtained after the artificial weathering of at least one substance containing minerals with the source solution, is particularly advantageous. For example, it can be provided that the organic carrier material or the organic fertilizer comprises a nutrient humus mass content of 20% to 40% and a permanent humus mass content of 60% to 80%.

The technical soil formation can be further improved if the organic carrier material or the organic fertilizer is further enriched with clay minerals. Here, for example, montmorillonite and/or zeolite and/or other geominerals can be used as additions to the organic carrier material or the organic fertilizer.

Further, according to another embodiment of the method according to the invention, it is possible to further process the fertilizer according to the invention to obtain a granulate. Here, it is provided, for example, that the granulate comprises the fertilizer according to the invention and/or the fertilizer precursor and/or primary rock flour, in particular diabase (US: greenstone) flour, and lignite or lignite flour, in particular with a grain size of 10 μm to 40 μm, and a bonding agent, in particular a bonding agent containing starch or lignosulphonate. The further processing to a granulate leads to a very simple and successful fertilization, in particular in lawn fertilization such as on golf courses. For the application on hillsides, preferably in an application from the air, such as from a plane or a helicopter, the granulate is highly suitable as well.

As an alternative to adding the fertilizer according to the invention to an organic carrier material, the method according to the invention in another advantageous embodiment provides that the at least one substance containing minerals comprises at least one organic basic substrate. In this way, the advantages of a biomass fermentation solution and an addition of the finished fertilizer to an organic carrier material, in particular an organic fertilizer, can be achieved, wherein the total procedural expenditure for producing the respective organomineral fertilizer can be reduced significantly. Here as well, the functionality of a fertilizer can thus be combined with the functionality of a soil improvement agent. If at least one organic basic substrate is added to the substance containing minerals, it can be described by the term of an organomineral compound as an alternative to the term of the substance containing minerals. For the addition of the acidic basic solution to the organomineral compound, a volume of 333 ml of source solution for up to 1 t or up to 5 $m^3$ of organic compound is sufficient.

Here, it has proven particularly advantageous if the organic basic substrate is wood waste, in particular soft wood waste, and/or biological waste and/or farm manure. These organic basic substrates are substances which, as is known, are degradable faster via natural rotting and hence are also suitable for technical rotting, in particular in combination with the weathering of a substance containing minerals.

In order to make possible or facilitate in particular the technical rotting or conversion of the organic basic substrate by adding the acidic source solution, an advantageous variation of the method according to the invention provides that the substance containing minerals or the organomineral compound is subjected to a pressure and/or heat treatment prior to adding the basic solution.

Here, it is furthermore advantageous if the pressure and/or heat treatment is preceded by a pre-homogenization. This ensures that the processes which are performed, induced or initiated by the pressure and/or heat treatment run or start homogenously in the entire organomineral compound. Through a mixing process, for example by means of an attachment mixer, such a pre-homogenization can be realized with little procedural effort.

For the method according to the invention, it is particularly advantageous herein if during the pressure and/or heat treatments of the substance containing minerals pressures and/or temperatures at least temporarily affecting the substance containing minerals make possible at least a sanitization and/or a coalification and/or a humification and/or a cellulose digestion and/or a defibration in the substance containing minerals. Herein, the afore-mentioned processes take place in particular in the organic basic substrate comprised in the substance containing minerals. To this effect, it is made sure for the organic basic substrate that the physical rotting, which results at least partially from mechanical influences and also takes place in nature in the conversion of organic materials, can also take place in the method according to the invention.

In this regard, it is particularly advantageous if in a combined pressure/heat treatment of the substance containing minerals pressures in the range of 200 to 600 bar, in particular in the range of 380 to 520 bar, and temperatures in the range of 200 to 300° C., in particular in the range of 210 to 250° C., act on the substance containing minerals. Thus, the desired processes within the substance containing minerals can take place in a very short time and on a very large scale. This, in turn, allows for a very inexpensive and large-scale technical production of a respective fertilizer in very short process times.

Since in a pressure and/or heat treatment of the organomineral compound other gases apart from water vapor, in particular hydrocarbon gases, such as methane gas $CH_4$, and/or nitrogenous gases, such as nitrogen dioxide $NO_2$, are generated, a regulation or targeted influencing of the atmosphere during and/or after the pressure and/or heat treatment is appropriate. For the method according to the invention, the excitement of electric discharges in the atmosphere of the pressure and/or heat treatment is particularly suitable. By exciting electric discharges, combustible hydrocarbon gases can be selectively burnt. Also, excited electric discharges allow for the nitrogen deposition of nitrogen bound in nitrogenous gases into the substance containing minerals, by which, in turn, the nitrogen content of the fertilizer with the properties of a soil improvement agent is enhanced, which, in turn, improves the efficiency of the fertilization or soil improvement. For the optimal effect of the excited electric discharges, it is advantageous in the method according to the invention if said discharges are excited in the area of the heat and/or pressure treatment in which the highest gas concentrations of nitrogenous gases and/or hydrocarbon gases are to be expected.

For the application of the acidic source solution onto the substance containing minerals it can be provided that the source solution is first diluted or mixed with softened and biologically stabilized water and is then applied or added in the form of atomized spray.

It is a prerequisite for a constantly high quality of such a fertilizer which also comprises the functionality of a soil improvement agent due to the use of the organic basic substrate that the source solution can act homogenously on all components of the substance containing minerals. Thus, the artificial weathering of the minerals and the biochemical rotting of the organic components are possible simultaneously. Hence, the method according to the invention provides that the substance containing minerals is subjected to a mixing process after the addition of the source solution.

Additionally, it is particularly advantageous for the fertilizing effect of such a technically produced fertilizer if it has a highest possible homogeneity. Only in this way, an insufficient dosage or an overdosage during the respective application can be avoided. Hence, another particularly advantageous embodiment of the method according to the invention pertains to the substance containing minerals being subjected to a homogenization process after the addition of the source solution.

In order to be able to perform the production of the fertilizer according to the invention, which can also be described as a technically produced, nutrient-loaded permanent humus, as fast as possible, with high throughput, low expenditure in terms of technical facilities and, thus, inexpensively, it is furthermore the object of the present invention to provide a device for the production of an organomineral fertilizer.

The invention is based on the fundamental idea that, after a hydrothermal pre-processing, an organomineral compound can be mixed with an acidic source solution which triggers at least the technical weathering of the minerals present in the compound. The provision of an organomineral compound is made possible by the device according to the invention due to the fact that several storage devices are located along a first transport device, which are at least one biomass storage device and at least one rock flour storage device, each having at least one outlet device. Thus, the release of biomass and rock flour onto or into the first transport device is made possible. Downstream of the first transport device in the transport direction, the device according to the invention comprises a compression device which receives a substance containing minerals or an organomineral compound from the first transport device, temporarily compresses and heats it while being subjected to pressure and heat and releases it onto a second transport device. Herein, it can be provided that the rock flour storage devices each comprise at least one second outlet device which allows for a release of rock flour to the second transport device.

In order to provide for the solution storage device an acidic source solution, which allows for a weathering of minerals and a rotting of biomass, an advantageous embodiment of the device according to the invention provides that a solution storage device comprises a solution receiving device which is provided for receiving a solution from a conversion device for the conversion of a nutrient solution, in particular a sugar solution with a SCOBY, in particular kombucha. Herein, it is further provided that the solution storage device or the solution outlet device comprises a mixing device which allows for the mixing of the acidic source solution with softened biologically stabilized water. This makes possible the use of an acidic source solution in the device according to the invention, which is able to cause the processes which take place in nature in weathering and rotting to run with a process speed which is up to a thousand times faster.

For the application of the acidic source solution or the diluted acidic source solution it is advantageous if the solution outlet device comprises an atomized spray generation device with which the acidic source solution is applied to the substance containing minerals on or in the second transport device in the form of an atomized spray.

Since a certain pre-processing in particular of the biomass prior to the use or the addition of the acidic source solution for the technical production of the organomineral fertilizer or the technically produced, nutrient-enriched permanent humus is highly desirable, the compression device is to be realized preferably in such a manner that the pressures and/or temperatures acting at least temporarily on the substance containing minerals or the organomineral compound can cause at least partially a sanitization and/or a coalification and/or a humification and/or a cellulose digestion and/or a defibration in the substance containing minerals. Through the above-mentioned processes via a thermo-hydraulic influence a partial rotting of the biomass is caused, which can then be continued or completed through the use of the source solution.

In a preferable manner, the compression device is realized as a twin-screw extruder, wherein a variable spiral path of the two screws is provided, wherein a thus created compression zone of the twin screw extruder can generate a temporary pressure between 400 and 600 bar and a temporary temperature between 200 and 300° C. in the substance containing minerals when the substance containing minerals passes through. Such a realization of the compression device is characterized in particular by a low wear and, consequently, low maintenance.

For an optimal process flow in the compression device, it is advantageous if the substance containing minerals or the organomineral compound is subjected to a pre-homogenization prior to entering the compression device. Thus, it is made sure that during the compression there is a certain basic homogeneity of the substance to be compressed. Hence, an advantageous embodiment provides that, upstream of the compression device, a pre-mixing device is provided. Said device can be an attached mixer, for example.

During the compression of the substance containing minerals in the compression device, different gases are generated. They are, besides water in the gas phase, mainly hydrocarbon gases and nitrogenous gases in the form of $NO_x$. The hydrocarbon gases are commonly combustible or flammable and therefore contain a certain risk for the operation of the device according to the invention. The nitrogenous gases, on the other hand, contain nitrogen, which, as a result of the influences in the compression device, is released from the substance containing minerals. For the device according to the invention it is therefore especially desirable if the highly flammable hydrocarbon gases are burnt in a controlled manner in the compression device and at least a part of the nitrogen contained in the nitrogenous gases is reintroduced into the substance containing minerals. This is achieved by means of an electric discharge device, which is realized in such a manner that in the atmosphere of the compression device, in particular in the area of the highest compression and/or in the exit area, a pulsed electric field is generated which excites electric discharges. By means of the discharges, the hydrocarbon gases are burnt in a targeted manner and an atmospheric nitrogen deposition is made possible. In other words, this means that due to the electric discharges a net nitrogen input from the nitrogenous gases back into the substance containing minerals takes place and, thus, the danger of combustible or flammable gases is prevented.

In order to ensure the controlled burning of hydrocarbon gases and the nitrogen deposition from the atmosphere of the compression device as effectively as possible, the device according to the invention provides an electric discharge device which generates a pulsed electric field with a frequency of 10 to 100 Hz and a voltage of between 10 and 50 kV.

In order to make possible a conversion as effective as possible of the source solution with the organomineral compound or the substance containing minerals, which, in turn, defines the weathering and rotting efficiency, an advantageous embodiment provides that along the second transport device on a position in the transport direction downstream of the position of addition of the acidic source solution a mixing device is provided which serves for the mixing of the substance containing minerals and the source solution. Due to the improvement of the conversion of the acidic source solution with the organomineral compound, a continuously high quality of the produced fertilizer or permanent humus and a high mass throughput through the device can be achieved.

Further, a high degree of homogeneity is required for a continuously high quality of the organomineral fertilizer or of the technically produced, nutrient-enriched permanent humus produced with the device according to the invention. Hence, in another embodiment it is provided that along the second transport device, in the transport direction downstream of the position of addition of the acidic source solution and/or of the position of the mixing device, a homogenization device is provided, which serves for the homogenization of the organomineral fertilizer.

A particularly good homogenization performance is achieved in the device according to the invention if the homogenization device is realized in the form of a screw extruder.

It is basically optional in which form biomass is filled into, stored in and released from the biomass storage device. However, it is particularly advantageous for the technical production of nutrient-enriched permanent humus if the biomass storage device is adapted for the reception, storage and outlet of wood waste, in particular soft wood waste, and/or farm manure and/or biological waste.

Since an overload of the compression device is to be avoided and a technical weathering as effective as possible of the organomineral compound or the substance containing minerals is to be made possible, the at least one used grain size of the rock flour or rock flours stored in the rock flour storage devices is of special influence for the entire device. Since rock flour grain sizes of 10 to 40 µm, in particular of 10 to 20 µm, have proven particularly advantageous for fertilizer production, it is therefore also particularly advantageous if the rock flour storage devices are adapted for the storage of rock flour in the above-mentioned grain sizes.

Further, an advantageous embodiment of the device according to the invention provides that the biomass storage device and/or at least one rock flour storage device is realized in the form of a silo. Alternatively, the use of open push floor or scraper floor bunkers can be envisaged. This reduces the danger of spontaneous dust or gas ignitions and/or explosions.

Different embodiments of the invention are schematically illustrated in the drawings and are exemplarily explained in the following.

Figure 1:
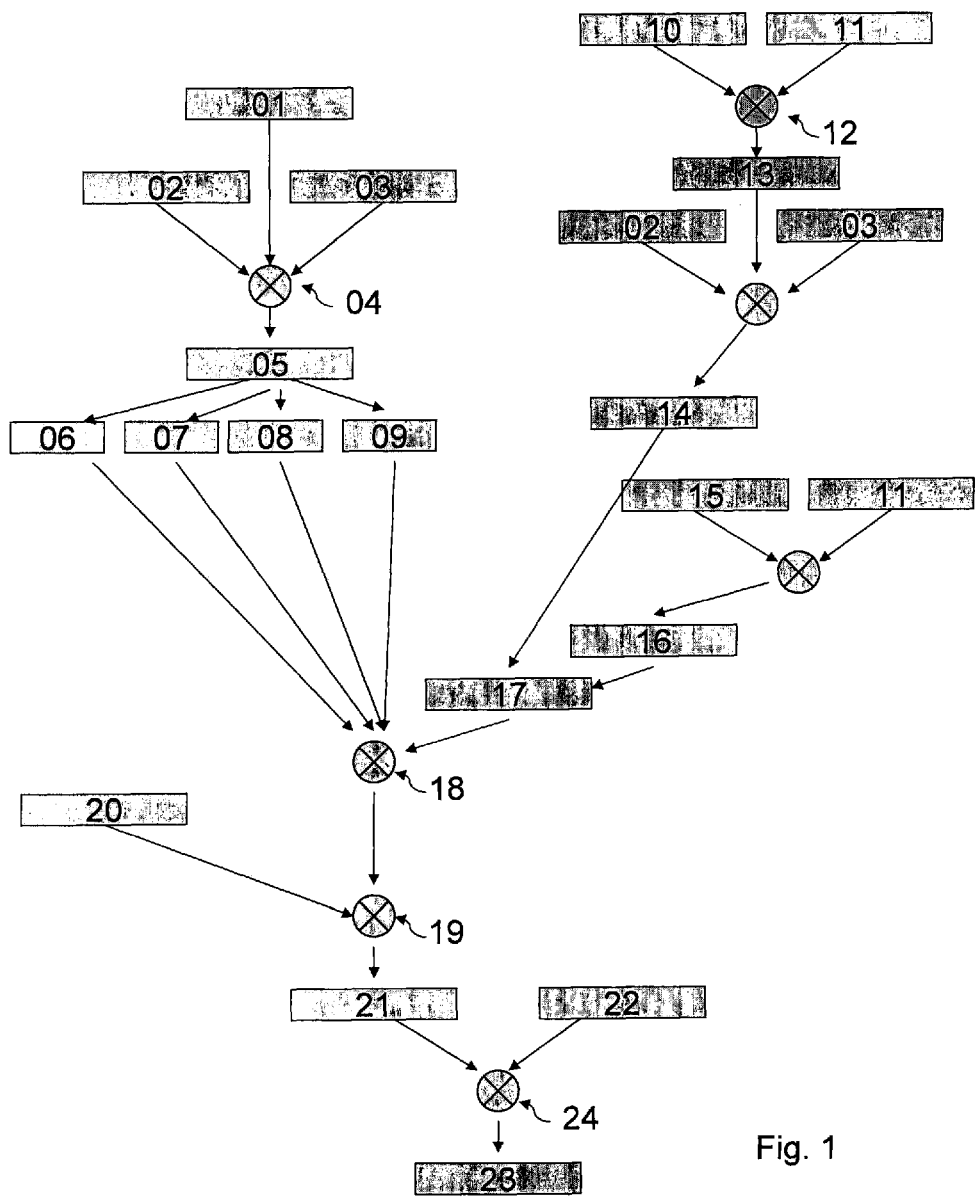
FIG. 1 shows a schematic process flow according to a first embodiment.

FIG. 1 shows a first embodiment of the method according to the invention. First, an aqueous tea solution 01 is brought together with sugar 02 and a SCOBY 03. Due to the conversion of the sugared tea solution with the SCOBY 03 in method step 04, the acidic source solution 05 is created, which comprises at least one organic acid, in particular glucoronic acid and/or dextrorotatory (L+) lactic acid acetic acid and/or folic acid and/or gluconic acid and/or tartaric acid and/or citric acid and/or lactic acid and/or oxalic acid and/or carbonic acid and/or tannic acid and/or malonic acid and/or usnic acid and/or succinic acid and/or malic acid and/or at least one amino acid. Further, the acidic source solution 05 can comprise the enzymes produced by the conversion of the SCOBY with the sugared nutrient solution, such as invertase and/or amylase and/or catalase and/or rennet enzyme and/or saccharase and/or protoelytic enzyme, alcohols, bacteria, yeasts, caffeine, antibiotic substances and/or polyphenol. The acidic source solution 05 is then brought into contact with substances containing minerals in the form of primary rock flour. The primary rock flour is rock flour containing diabase (US: greenstone) 06, diatoms 07, lignite 08 and $Fe^{2+}$ 09.

Furthermore, nettles 10 are added to biologically stabilized water 11, wherein between 5 and 60 g of nettles 10 are added per one liter of biologically stabilized water 11. Subsequently, in method step 12, a heat treatment and/or an extraction of juice takes place. The heat treatment takes place preferably at temperatures between 75 and 95° C. The thus created biomass extract 13 is also mixed with sugar 02 and a SCOBY 03, which triggers a fermentation which runs for 3 to 4 weeks at temperatures between 20 and 30° C. and results in a biomass fermentation solution 14.

By adding molasses 15 to biologically stabilized water 11, a nutrient solution 16 is created. Here, for producing the nutrient solution 16, circa 50 g molasses are taken up by 965 ml of biologically stabilized water in such a manner that a part, for example 35 ml, of the biologically stabilized water is removed, the molasses are dissolved in it by heating and the thus created solution is then added back into the remaining biologically stabilized water.

By adding biomass fermentation solution 14 to the nutrient solution 16, a carrier solution 17 is created. Here, it can be provided that 35 g of the biomass fermentation solution are added to 965 ml of nutrient solution, wherein the temperature is preferably regulated to a range between 20° C. and 35° C. Then, the solution or fertilizer precursor created by technically weathering diabase (US: greenstone) 06, diatoms 07, lignite 08 and rock flour containing $Fe^{2+}$ is added to the carrier solution. In terms of volume, the addition of the fertilizer precursors from the conversion of the acidic source solution 05 with 06 to 09 to the carrier solution 17 here takes place with equivalent volume fractions. For example, an addition of respectively 50 ml of the fertilizer precursor to 1000 ml of the carrier solution can be envisaged. After the addition of the fertilizer precursors from the conversion of the acidic source solution 05 with 06 to 09 to the carrier solution 17 in method step 18, in method step 19 an adaption of the pH value takes place by adding a diluting agent 20.

The thus produced fertilizer 21 can be mixed with an organic carrier agent 22 in suitable mixing ratios to an organomineral fertilizer 23 in method step 24. As a carrier material, for example, a granulate of geominerals and/or clay minerals and/or lignite can be used.

Figure 2:
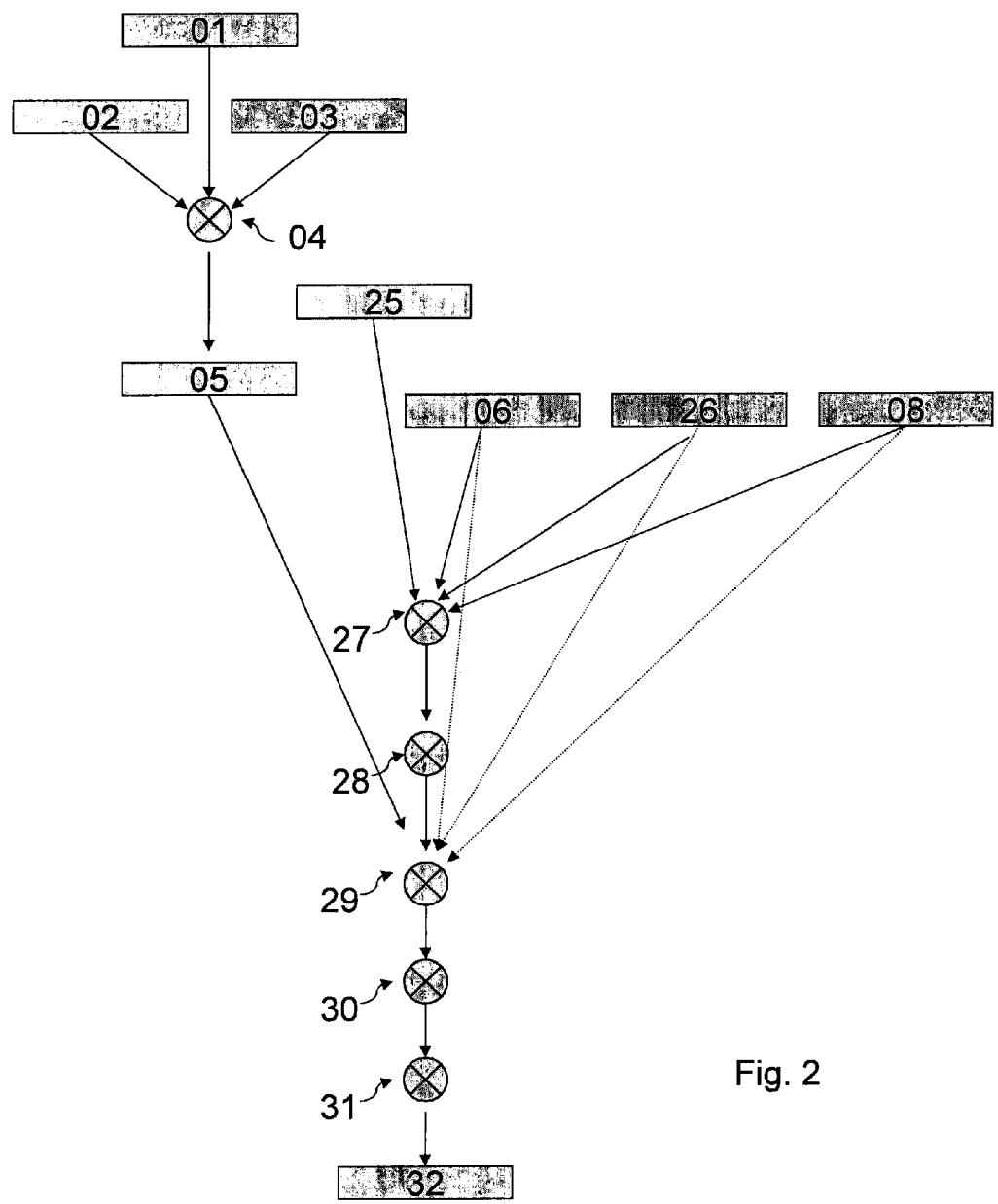
FIG. 2 shows a schematic process flow according to a second embodiment.

FIG. 2 shows a second embodiment of the method according to the invention. Here as well, first, a nutrient solution made of a tea solution 01 and sugar 02 is mixed with a SCOBY 03 and is converted in method step 04 by converting the sugar 02 contained in the nutrient solution into an acidic source solution 05 having a pH value below 3.

Rock flours from diabase (US: greenstone) 06, bentonite 26 and lignite 08 are added to an organic basic substrate 25. The grain sizes of the respective rock flours are between 10 and 40 μm. By bringing together the organic basic substrate 25 with the rock flour 6, 26 and 8, an organomineral compound is created in method step 27, which is subjected to a pressure and/or heat treatment 28. Subsequently, in method step 29, the addition of the acidic source solution 05 to the thermally and/or mechanically processed organomineral compound takes place. Advantageously, prior to the addition, the acidic source solution is diluted with softened and biologically stabilized water (not shown). In doing so, a technical weathering of the minerals and a biochemical rotting of the organic material is triggered. The weathering of the minerals and the rotting of the organic material can be improved by a mixing process 30. By means of a homogenization process 31, a technically produced, nutrient-enriched permanent humus 32 with constant nutrient content can ultimately be produced.

Figure 3:
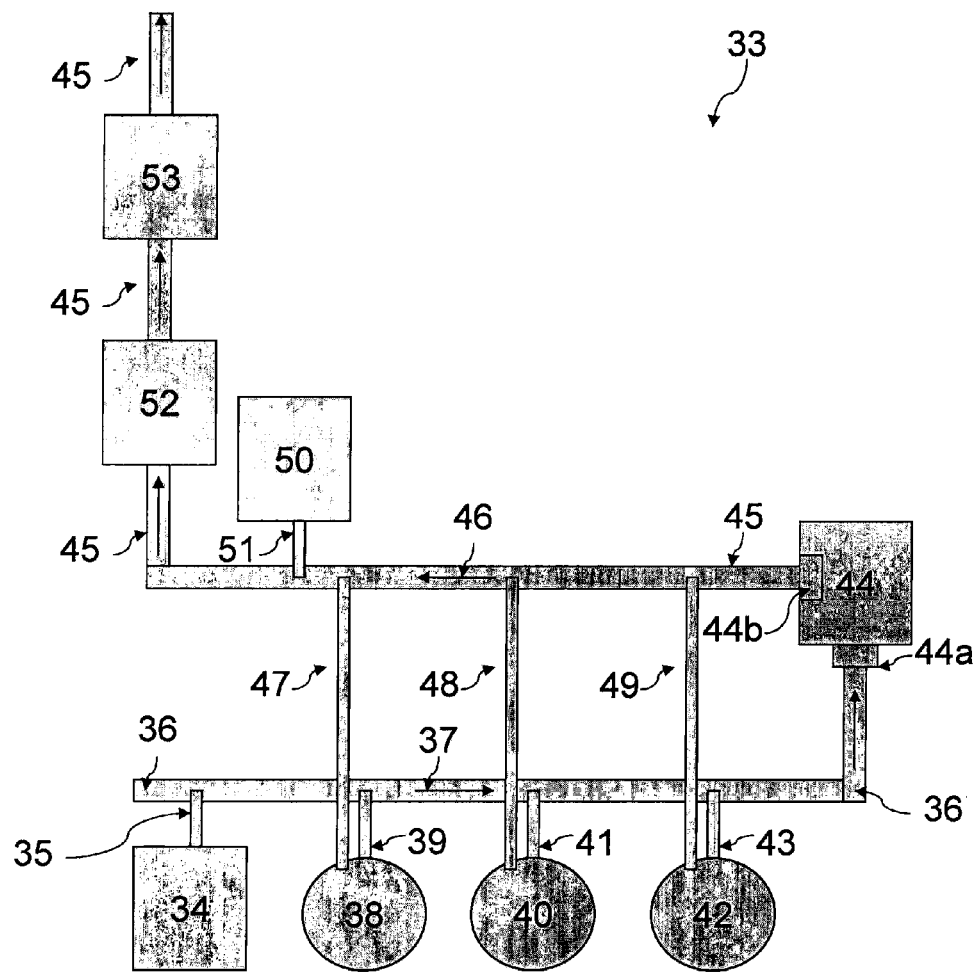
FIG. 3 shows a schematic illustration of the device according to the invention.

FIG. 3 shows a schematic illustration of the device 33 according to the invention. From a biomass storage device 34 biomass is released onto a first transport device 36 via an outlet device 35, which is suitable for releasing biomass. The transport device 36 can be realized, for example, in the form of a conveyor belt. The transport direction of the transport device 36 is indicated by the directional arrow 37. After biomass has been added onto the transport device 36, diabase (US: greenstone) rock flour is added onto the transport device 36 and on the biomass present on it from a rock flour storage device 38 via an outlet device 39. During the further transport along the first transport device 36, furthermore, bentonite rock flour is added onto the first transport device from the rock flour storage device 40 via the outlet device 41 as well as lignite flour from the rock flour storage device 42 via the outlet device 43.

The thus formed compound structure of biomass and rock flour is transported by the first transport device 36 into a compression device 44. The compression device 44 can be realized, for example, as a twin screw extruder whose spiral paths have a compression zone and compress and/or heat the loose biomass rock flour compound at a low wear under high pressure and temperature loads. Herein, a pre-homogenization of the compounds by means of a pre-homogenization device 44a, which is situated upstream of the compression device and which is for example realized as an attached mixer, can take place.

Furthermore, the compression device can comprise an electric discharge device 44b, with which combustible gases, which are generated during the compression, can be burnt and a nitrogen deposition of nitrogen bound in nitrogenous gases back into the compound is made possible. The electric discharge device herein is preferably arranged in the exit area of the compression device and generates a pulsed electric field with a frequency of 10 to 100 Hz and a voltage of 10 to 50 kV.

After passing through the compression device 44, the organomineral compound is released onto a second transport device 45, which ensures the further transport in the direction of the directional arrow 46. After passing through the compression device 44, diabase (US: greenstone) and/or bentonite and/or lignite rock flour can be added to the organomineral compound on the second transport device 45 via respective second outlet devices 47, 48 and 49 of the rock flour storage devices 38, 40 and 42. From a solution storage device 50, which is adapted for the storage of an acidic source solution, the acidic source solution is released via an outlet device 51 onto the second transport device 45 and the compound present on it. For the application, an atomized spray creation device is particularly suitable, which is comprised in the solution outlet device or is attachable thereto and allows for the spraying of the substance containing minerals with the acidic source solution or a diluted acidic source solution in the form of an atomized spray. Furthermore, it is advantageous if the acidic source solution is diluted prior to the application to the organomineral compound. Hence, it may be provided that the solution storage device or the solution outlet device comprises a mixing device which makes it possible to mix the acidic source solution with softened, biologically stabilized water.

The beginning mineral weathering and organic rotting processes are supported by the fact that a mixing device 52 is arranged along the second transport device 45 in the transport direction 46 downstream of the outlet of the solution storage device 50. Additionally, along the transport device 45, a homogenization device 53 is arranged downstream of the mixing device 52 in the transport direction. Said homogenization device 53 can be realized in the form of a screw extruder and serves for the homogenization of the technically produced, nutrient-enriched permanent humus or soil improvement agent.

The invention claimed is:

1. A method for producing a fertilizer, said method comprising the following method steps:
   a) fermenting a sugared solution containing nutrients with a symbiotic colony of bacteria to produce a source solution having at least one dissolved organic acid, wherein the pH value of the source solution is between 0 and 3, the sugared solution containing nutrients being a sugared tea solution and the symbiotic colony of bacteria and yeasts being a kombucha;
   b) contacting the source solution with at least one substance containing rock flour in grain sizes of 10-40 µm; and
   c) maintaining the source solution in contact with the at least one substance containing rock flour over a period of 7-60 days to artificially weather the rock flour.

2. The method according to claim 1, in which the rock flour includes a substance selected from a group consisting of at least one of primary rock flour, geomineral flour, and, rock flour containing $Fe^{2+}$, the primary rock flour being from diabase, diatoms, bentonite and/or, lignite.

3. The method according to claim 1, in which while maintaining the source solution in contact with the at least one substance containing rock flour, the at least one substance containing rock flour is enclosed by is container that is permeable to the source solution.

4. The method according to claim 1, including diluting the source solution after contact with the at least one substance containing rock flour to have a pH value between 6.8 and 7.2 with a carrier solution.

5. The method according to claim 4, in which the carrier solution is produced by mixing at least one biomass fermentation solution and a sugared solution containing nutrients with a symbiotic colony of bacteria, wherein the biomass fermentation solution is obtained by fermenting a liquid, sugared biomass extract with a symbiotic colony of bacteria and yeasts, wherein fermentation takes place at a temperatures in a range of 20° C.-30° C. for a period of 3-4 weeks.

6. The method according to claim 5, in which the liquid biomass extract is produced by treating plants with at least one of heat and/or extracting the juice from plants that are placed in biologically stabilized water, wherein mass per unit volume of the plants placed in water is in a range of 5 g/l-60 g/l, and heat treatment of the plants placed in water takes place at a temperature in a range of 75° C.-95° C. over a period of 5 min-25 min.

7. The method according to claim 5, in which the sugared solution containing nutrients with a symbiotic colony of bacteria includes sugar dissolved in biologically stabilized water.

8. The method according to claim 5, including forming a solution comprising the at least one solution added to an organic carrier material, wherein the organic carrier material includes organic fertilizers.

9. The method according to claim 1, in which the substance containing rock flour includes at least one organic basic substrate, wherein the organic basic substrate includes wood waste, and wherein the substance containing rock flour is subjected to pressure and/or heat treatment prior to addition of the source solution, and wherein the substance containing rock flour is subjected to a pre-homogenization prior to the pressure and/or heat treatment.

10. The method according to claim 9, in which during the pressure and/or heat treatment, electric discharges are excited in an atmosphere of the pressure and/or heat treatment during the pressure and/or heat treatment, and wherein during a combined pressure-heat treatment, pressures in the range of 200 bar-60 bar and temperatures in the range of 200° C.-300° C. act on the substance containing rock flour.

11. The method according to claim 1, in which the substance containing rock flour includes farm manure and/or biological waste, and wherein the substance containing rock flour is subjected to pressure and/or heat treatment prior to addition of the source solution, and wherein the substance containing rock flour is subjected to a pre-homogenization prior to the pressure and/or heat treatment.

* * * * *

UNITED STATES PATENT AND TRADEMARK OFFICE
CERTIFICATE OF CORRECTION

| | | |
|---|---|---|
| PATENT NO. | : 9,005,919 B2 | Page 1 of 1 |
| APPLICATION NO. | : 13/822193 | |
| DATED | : April 14, 2015 | |
| INVENTOR(S) | : Anja Enders-Douglas | |

It is certified that error appears in the above-identified patent and that said Letters Patent is hereby corrected as shown below:

In the specification,

Column 1, line 43
"in to the" should be --in the--

Column 1, lines 64 and 65
Delete the sentence "Advantageous embodiments of the invention are the subject matter of the dependent claims."

In the claims,

Column 14, line 41
"60" should be --600--

Signed and Sealed this
Ninth Day of February, 2016

Michelle K. Lee
*Director of the United States Patent and Trademark Office*